United States Patent [19]

Delapierre

[11] 4,418,326
[45] Nov. 29, 1983

[54] MEASURING DEVICE USING A STRAIN GAUGE

[75] Inventor: Gilles Delapierre, Seyssinet, France

[73] Assignee: Commissariat a L'Energie Atomique, Paris, France

[21] Appl. No.: 320,183

[22] Filed: Nov. 12, 1981

[30] Foreign Application Priority Data

Nov. 20, 1980 [FR] France .................. 80 24656

[51] Int. Cl.³ .............................. G01L 1/22
[52] U.S. Cl. ......................... 338/5; 29/610 SG
[58] Field of Search ......................... 338/2-5; 29/610 SG; 73/726, 727, 721, 720

[56] References Cited

U.S. PATENT DOCUMENTS

| | | | |
|---|---|---|---|
| 3,713,068 | 1/1973 | Talmo | 338/2 |
| 3,803,706 | 4/1974 | Talmo | 338/2 X |
| 3,805,377 | 4/1974 | Talmo et al. | 338/2 X |
| 3,953,920 | 5/1976 | Endo | 338/2 X |
| 4,016,644 | 4/1977 | Kurtz | 338/2 X |
| 4,195,279 | 3/1980 | Lemcoe et al. | 338/2 |

FOREIGN PATENT DOCUMENTS 2066641 8/1971 France .
2440547 5/1980 France .

Primary Examiner—C. L. Albritton
Attorney, Agent, or Firm—James E. Nilles

[57] ABSTRACT

The invention relates to a measuring device using a strain gauge.

The device comprises a test body (1), whereof one face (6) is compressively stressed and to which is fixed a strain gauge (7) constituted by a resistive coating (8) deposited on a thin glass support (9), the thickness of the latter being approximately 150 μm.

Application to electronic weighing.

11 Claims, 2 Drawing Figures

MEASURING DEVICE USING A STRAIN GAUGE

BACKGROUND OF THE INVENTION

The present invention relates to a measuring device, which uses a strain gauge. More specifically, it relates to a device making it possible to perform more accurate measurements than the best prior art devices, whilst being much less costly than the latter. This invention has numerous applications in the field of metrology and particularly electronic weighing.

The best known existing method for obtaining strain gauges consists of using a thin polyimide film to which is stuck a very thin sheet (approx. 5 μm) of a resistive material based e.g. on nickel, chromium or copper. The resistive coating is then made into fine strips in order to obtain a resistance of suitable value and form, the gauge then being directly connected by adhesion to the test body.

Although such gauges make it possible to carry out very accurate measurements (up to $10^{-4}$ of the effective range), their manufacture is complicated and difficult. Thus, the handling and adhesion of very thin sheets is far from easy and it is even more difficult to manufacture sheets with a thickness of even 5 μm. Thus, such gauges are very expensive and it is difficult to envisage their use in mass-produced sensors.

Another method consists of producing the gauge directly on the test body by the vacuum deposition of an insulating layer, followed by a resistive layer. The use of a mineral insulant with a very limited thickness gives the sensor a very good stability and good metrological properties, but this method also suffers from disadvantages. The surface of the test body on which the deposit is made must undergo very careful polishing to prevent any holes in the insulant. Furthermore, with the output of the machines used expressed in surface units per time unit, the cost of the sensors is proportional to the surface of the test body on which they are placed and the latter is sometimes relatively large for mechanical strength reasons. Finally, due to the sensitivity of the test body, to both chemical products and heat treatments, the production process can be very complicated, which considerably increases the cost thereof.

Finally, a third method uses as the test body a monocrystalline silicon sheet in which resistors are produced by the diffusion of a doping agent as in integrated circuits. Although this method permits mass production, the sensitivity of silicon to temperature changes does not at present make it possible to obtain precisions better than $10^{-2}$ of the effective range.

BRIEF SUMMARY OF THE INVENTION

The present invention relates to a device which obviates the aforementioned disadvantages as a result of an improved gauge, permitting both accurate measurements and a large-scale, low-cost production of the device.

The present invention therefore specifically relates to a device for measuring a variable quantity of the type comprising a test body which can deform under the action of the quantity to be measured, wherein the said test body has at least one compressively stressed face to which is fixed at least one strain gauge, the latter having a coating which is sensitive to deformations fixed to a so-called pellicular thin glass support, the thickness of the latter being between 60 and 400 μm.

According to this embodiment, the thickness of the glass support is between 100 and 250 μm and preferably close to 150 μm.

The elastic properties of thin glass plates are known and the idea of using them as a test body, particularly for pressure measurements is not new. However, there is a limitation to cases where the deformations therefore are not too great because, when the test body deforms, part thereof is tensile stressed and the breaking limit of the glass is approximately 8 times lower in tension than in compression. However, according to the present invention, the thin glass plate only serves as a support for the gauge and is adhered to one face of the test body which is compressively stressed. The whole thin glass plate is compressively stressed and it is possible to measure stresses with an 8 times higher sensitivity.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
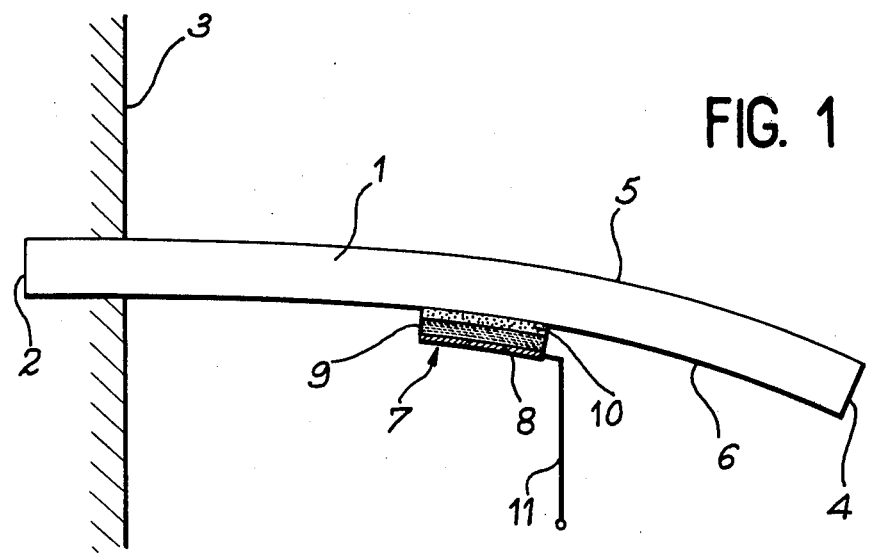
FIG. 1 a diagrammatic sectional view of an embodiment of the device according to the invention.

FIG. 1 shows a test body 1 in the form e.g. of a steel plate, whereof one end 2 is anchored in a wall 3, whilst the other end 4 is free. Under the action of the quantity of magnitude to be measured (e.g. force), body 1 deforms, one of its faces 5 being tensile stressed and the other face 6 compressively stressed. Face 6 carries a strain gauge 7 comprising a thin deformation-sensitive coating 8. In the present case, it is a resistive coating deposited on the thin glass plate 9. Gauge 9 is adhered to the test body by means of a sealing layer 10. The gauge is connected to the not shown amplifier by a group of connecting wires 11.

The gauge can be produced by any per se known method, particularly by vacuum deposition, atomization or evaporation of a resistive material on the thin glass plate.

Numerous resistive materials can be used and in particular metals or metal alloys, e.g. based on nickel—chromium, chromium—silicon dioxide, platinum, tantalum, etc. and the vacuum deposition process makes it possible to deposit a very thin coating of between 50 and 500 nm. This leads to a considerable metal saving and the thinner the coating the better the definition of the resistance of the gauge during the etching of the patterns.

The use of a very thin metal coating also makes it possible to obtain a high resistance or strength per length unit, which simplifies the construction of the gauge.

Figure 2:
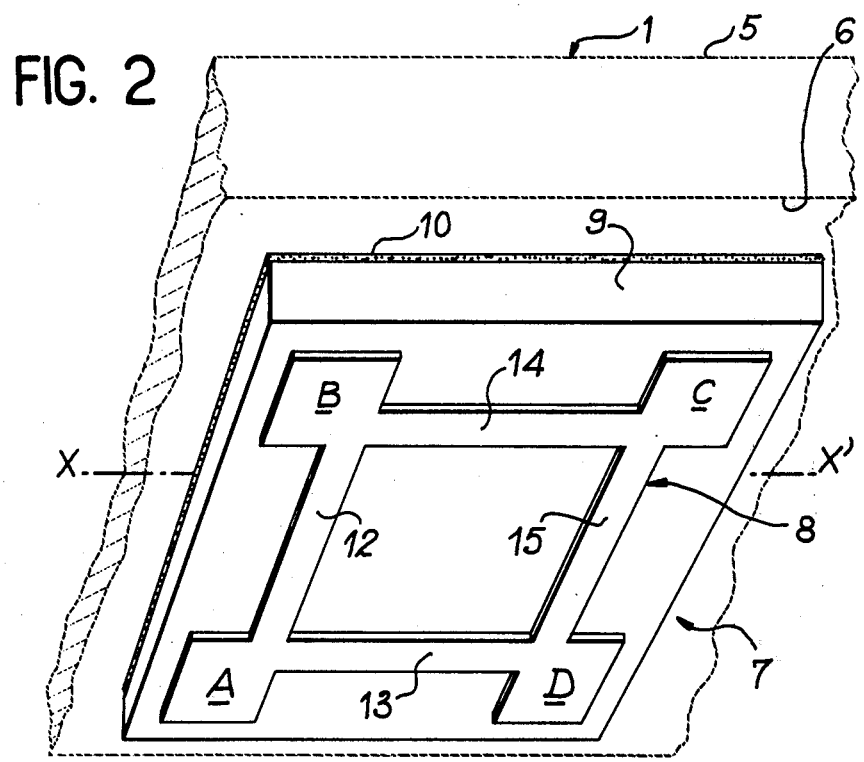
FIG. 2 a larger scale perspective plan view of the device of FIG. 1 showing the shape of the strain gauges used according to the invention.

The shape of the gauge can be seen in the perspective view of FIG. 2. The resistive coating 8 deposited on thin glass plates 9 is formed from four identical metal strips 12, 13, 14, 15 arranged in the form of a square, symmetrically relative to the longitudinal axis XX' of the steel plate 1 forming the test body. Strips 13 and 14 are parallel to the axis of the test body and strips 12 and 15 are perpendicular. At the apices of the square, there are four contacts A, B, C and D. The metal strips 12, 13, 14, 15 constitute the four resistors of a Wheatstone bridge supplied with power between A and B, whilst the output voltage is measured between B and D. The dimensions of the gauge are very small because the complete bridge formed in this way represents an approximately 5 nm square.

When the test body bends under the action of the quantity to be measured, i.e. when its axis deforms in such a way that the thin glass plate 9 is compressively stressed, strips 13 and 14 are also compressively stressed. Their resistance varies, which leads to an unbalance of the Wheatstone bridge which is proportional to the deformation of the test body.

Moreover, it has surprisingly been experimentally found that strips 12 and 15 underwent a slight tensile stress, which accentuates the unbalance of the bridge and increases the sensitivity of the device.

The use of very thin metal strips, e.g. with a thickness of 150 nm, makes it possible to reduce the cost of the device due to the thus obtained metal saving and due to the very simple configuration of the gauge. Furthermore, each resistive element of the bridge, no matter whether it is subject to tensile stress or compressive stress, is deformed in the same direction at all points, so that the maximum theoretical sensitivity of the sensor is obtained. This represents an important advance compared with the prior art methods where the design of the resistors is such that some parts are deformed in the opposite direction to others.

The thin glass support must have a thickness which is sufficiently low not to prejudice the deformation of the test body, but sufficiently high that it is possible to manipulate the gauge without too many difficulties. A good compromise has been obtained with glass thicknesses between 60 and 400 $\mu$m and preferably close to 150 $\mu$m.

The adhesion of the thin glass support to the test body can be carried out by any known means, e.g. using fast-acting adhesives based on methyl-2-cyanoacrylate or epoxies having two components, by using a sealing glass which can be screen process printed or by welding. It is also possible for fixing to be carried out by means of a welding layer fixed to the thin glass supporting face opposite to the sensitive coating and welded to the test body.

The device according to the invention has numerous advantages and particularly an extremely low price. This is due to the fact that the thin glass plate forms a very economic substrate (approx. 0.01 Francs per sensor) permitting automated mass-production by joint treatment, and by the fact that the resistive material deposited in the form of a very thin coating by high-speed, readily reproducible processes leads to a very low metal consumption. There is a very wide choice of resistive materials and vacuum deposition leads to an excellent bond between the material and the glass. Moreover, the gauge support is sufficiently rigid, which facilitates its handling for adhesion purposes. Finally, the production process for the device is independent of the test body used.

The metrological performance levels of such a sensor are comparable to those obtained with better conventional gauges based on a pellicular pattern. The precision is approximately $10^{-3}$ to $10^{-4}$ of the effective range and the measuring signal has a comparable amplitude. The latter point is very important because the signal of conventional gauges which is already very weak, is essentially responsible for the price of the associated amplifiers. A further decrease in the sensitivity would lead to prices for the electronics, which were incompatible with most applications.

Obviously, the invention is not limited to the embodiment described hereinbefore and numerous variants are possible thereto without passing beyond the scope of the invention. For example, several gauges could be placed on the same support or it would be possible to use several test bodies each having one or more gauges.

With regards to the nature of the sensitive layers, other resistive coatings such as very fine gold coatings could be used (thickness below 5 mm) or bismuth coatings, well known for their very high sensitivity but also their very great instability. It is also possible to use coatings other than resistive coatings, e.g. semiconductor coatings or the like in which active components of the transistor type are formed. It is also possible to use dielectric coatings from which capacitors are produced. It is also possible to use a magnetostrictive material having a permeability which is a function of the stress.

The interest of using a glass support according to the invention is its good compatibility with the production methods for such devices.

What is claimed is:

1. A device for measuring a variable quantity comprising a test body which can deform under the action of the quantity to be measured, wherein the said test body has at least one strain gauge, the latter having a metallic coating which is sensitive to deformations fixed to a so-called pellicular thin glass support, the thickness of the latter being between 60 and 400 $\mu$m.

2. A device for measuring a variable quantity comprising a test body which can deform under the action of the quantity to be measured, wherein the said test body has at least one compressively stressed face to which is fixed at least one strain gauge, the latter having a metallic coating which is sensitive to deformations fixed to a so-called pellicular thin glass support, the thickness of the latter being between 100 and 250 $\mu$m and preferably close to 150 $\mu$m.

3. A device according to claim 1 wherein the metallic coating is deposited by a technique selected from a group of method steps involving vacuum deposition, atomization and evaporation of a resistive material.

4. A device according to claim 1 wherein the metallic coating comprises four identical metal strips arranged so as to form the four sides of a square.

5. A device according to claim 1, wherein the thin glass support is fixed to the test body by adhesion.

6. A device according to claim 1, wherein a welding layer is fixed to the face of the thin glass support opposite to the sensitive coating and the welding layer is welded to the test body.

7. A device for measuring a variable quantity comprising a test body which can deform under the action of the quantity to be measured, wherein the said test body has at least one compressively stressed face to which is fixed at least one strain gauge, the latter having a metallic coating which is sensitive to deformations fixed to a so-called pellicular thin glass support, the thickness of the latter being between 100 and 400 $\mu$m.

8. A device according to claim 2, wherein the metallic coating is deposited by a technique selected from a group of method steps involving vacuum deposition, atomization and evaporation of a resistive material.

9. A device according to claim 2, wherein the metallic coating comprises four identical metal strips arranged so as to form the four sides of a square.

10. A device according to claim 2, wherein the thin glass support is fixed to the test body by adhesion.

11. A device according to claim 2, wherein a welding layer is fixed to the face of the thin glass support opposite to the sensitive coating and the welding layer is welded to the test body.

* * * * *